(12) United States Patent
Endo et al.

(10) Patent No.: US 9,616,687 B2
(45) Date of Patent: Apr. 11, 2017

(54) PRINT DATA GENERATING DEVICE, PRINTING DEVICE, PRINT DATA GENERATING METHOD, AND PROGRAM

(71) Applicant: Seiko Epson Corporation, Tokyo (JP)

(72) Inventors: Tsunenobu Endo, Matsumoto (JP); Taisuke Okawa, Matsumoto (JP); Kan Matsuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/076,413

(22) Filed: Mar. 21, 2016

(65) Prior Publication Data

US 2016/0279976 A1   Sep. 29, 2016

(30) Foreign Application Priority Data

Mar. 24, 2015  (JP) .................................. 2015-061429

(51) Int. Cl.
| | |
|---|---|
| B41J 11/66 | (2006.01) |
| B41J 3/407 | (2006.01) |
| B41J 11/00 | (2006.01) |
| B41J 11/70 | (2006.01) |
| G06K 15/02 | (2006.01) |
| B26D 1/06 | (2006.01) |

(52) U.S. Cl.
CPC ............. *B41J 11/663* (2013.01); *B26D 1/065* (2013.01); *B41J 3/4075* (2013.01); *B41J 11/008* (2013.01); *B41J 11/703* (2013.01); *G06K 15/022* (2013.01)

(58) Field of Classification Search
CPC ....... B41J 11/663; B41J 11/008; B41J 11/703; B41J 3/4075; B26D 1/065; G06K 15/022
See application file for complete search history.

(56) References Cited

U.S. PATENT DOCUMENTS

| | | |
|---|---|---|
| 5,232,297 A | 8/1993 | Kitazawa |
| 5,934,812 A | 8/1999 | Nunokawa et al. |

(Continued)

FOREIGN PATENT DOCUMENTS

| | | |
|---|---|---|
| JP | 10-157240 A | 6/1998 |
| JP | 11-7087 A | 1/1999 |

(Continued)

OTHER PUBLICATIONS

European Search Report, Jul. 29, 2016, issued in related Patent Application No. EP16161945.

*Primary Examiner* — Justin Seo
(74) *Attorney, Agent, or Firm* — ALG Intellectual Property, LLC

(57) ABSTRACT

A print data generating device generates print data printable by a tape printer including a feeding mechanism which feeds a print tape in a scanning direction, a print head which performs print processing on the print tape fed in the scanning direction, and a tape cutter which is arranged downstream of the print head in the scanning direction and cuts the print tape. In the print data generating device, a print direction of a print image is changed in such a way that an image arrangement area on the print image of the print data, and a print area where the print processing is carried out by the print head in a paper feed acceleration/deceleration zone at the time of cutting the print tape, do not overlap with each other.

15 Claims, 13 Drawing Sheets

(56) References Cited

U.S. PATENT DOCUMENTS

| | | | |
|---|---|---|---|
| 6,196,661 B1 * | 3/2001 | Saito | B41J 19/202 347/16 |
| 6,229,591 B1 | 5/2001 | Motooka et al. | |
| 2013/0242316 A1 | 9/2013 | Iwata et al. | |
| 2013/0257951 A1 | 10/2013 | Kusuhata | |

FOREIGN PATENT DOCUMENTS

| | | |
|---|---|---|
| JP | 2004-106474 A | 8/2004 |
| JP | 2006-88670 A | 4/2006 |
| JP | 2009-297984 A | 12/2009 |
| JP | 2012-179882 A | 9/2012 |
| JP | 2013-208752 A | 10/2013 |

* cited by examiner

PRINT DATA GENERATING DEVICE, PRINTING DEVICE, PRINT DATA GENERATING METHOD, AND PROGRAM

CROSS-REFERENCE TO RELATED APPLICATION

The entire disclosure of Japanese Patent Application No. 2015-061429, filed Mar. 24, 2015 is expressly incorporated by reference herein.

BACKGROUND

1. Technical Field

The present invention relates to a print data generating device which generates print data printable by a line head-type printing device, a printing device, a print data generating method, and a program.

2. Related Art

According to the related art, a print system which includes a print data generating device (host computer) and a printing device for printing print data transmitted from the print data generating device is known (see JP-A-2009-297984). This printing device includes a sheet carrying unit which carries a paper roll in a paper feeding direction, a print head which is a line head configured to be able to print multiple dots simultaneously in a direction orthogonal to the paper feeding direction, and a cutting unit which cuts the paper roll with a cutter edge. In this printing device, print data is printed by a predetermined amount corresponding to the space between the print head and the cutter edge, then paper feeding is stopped to cut the paper roll, and subsequently the remaining print data is printed. This prevents a margin corresponding to the space between the print head and the cutter edge from being generated at the forward end of the printed material.

Meanwhile, in the related-art print system, where paper feeding is stopped so as to cut the paper roll after print data is printed by a predetermined amount, a deceleration zone is needed to stop paper feeding. Therefore, in practice, printing is executed in the deceleration zone to stop paper feeding. Printing is also executed in an acceleration zone to resume paper feeding. If an image (picture) is arranged on the area printed in the acceleration and deceleration zones, uneven density (in the form of stripes) may occur in the print image, as shown in FIG. 4A. This is because, in the acceleration and deceleration zones, the position where the paper roll is carried cannot be detected with high accuracy, the paper roll may slip due to the acceleration and deceleration, and the duration of heating of the paper roll by the thermal head is longer than usual, and the like. In this way, in the related-art print system, there is a risk of generating uneven density in an image arranged on a print image of print data.

To cope with this, it is conceivable that the paper roll may be fed backward and cut after all print data is printed, so as to avoid the execution of printing in the acceleration and deceleration zones. However, the function of feeding the paper roll backward or the like needs to be installed and this poses the problem of making the printing device more complicated.

SUMMARY

An advantage of some aspects of the invention is to provide a print data generating device, a printing device, a print data generating method and a program that can reduce uneven density generated in an image on a print image, with a simple configuration.

A print data generating device according to an aspect of the invention generates print data printable by a printing device including a feeding unit which feeds continuous forms paper in a scanning direction, a line head which performs print processing on the continuous forms paper fed in the scanning direction, and a cutting unit which is arranged downstream of the line head in the scanning direction and cuts the continuous forms paper. In the print data generating device, a direction in which a print image is printed is changed in such a way that an image arrangement area on the print image of the print data, and a print area where the print processing by the line head is carried out in a paper feed acceleration/deceleration zone at the time of cutting the continuous forms paper, do not overlap with each other.

In this case, it is preferable that the print data generating device includes a direction change decision unit which decides whether or not to carry out direction change processing of changing the direction in which the print image is printed, and a direction change execution unit which executes the direction change processing if the direction change decision unit decides that the direction change processing is to be carried out, and that the direction change decision unit decides whether or not to carryout the direction change processing in such a way that the image arrangement area and the print area in the acceleration/deceleration zone do not overlap with each other.

It is also preferable that the direction change decision unit analyzes the print data to determine the image arrangement area on the print image, and decides whether or not to carry out the direction change processing, using the determined image arrangement area.

It is preferable that the direction change execution unit executes processing of changing the direction in which the print image is printed, by 180 degrees, as the direction change processing.

A printing device according to another aspect of the invention includes the print data generating device, a feeding unit, a line head, and a cutting unit.

A print data generating method according to still another aspect of the invention is a print data generating method for generating print data printable by a printing device including a feeding unit which feeds continuous forms paper in a scanning direction, a line head which performs print processing on the continuous forms paper fed in the scanning direction, and a cutting unit which is arranged downstream of the line head in the scanning direction and cuts the continuous forms paper. In the print data generating method, a direction in which a print image is printed is changed in such a way that an image arrangement area on the print image of the print data, and a print area where the print processing by the line head is carried out in a paper feed acceleration/deceleration zone at the time of cutting the continuous forms paper, do not overlap with each other.

A program according to yet another aspect of the invention causes a computer to execute the print data generating method.

According to these configurations, since the direction in which the print image is printed is changed in such a way that the image arrangement area and the print area in the acceleration/deceleration zone do not overlap with each other, printing the image during the printing in the acceleration/deceleration zone can be avoided. Thus, uneven density in the printed image can be avoided. In this way, uneven density in the image on the print image can be reduced with a simple configuration without feeding the continuous forms paper backward or the like. The "acceleration/deceleration zone" in this description refers to an acceleration zone and/or deceleration zone.

In the print data generating device, it is preferable that the direction change decision unit decides whether or not to carry out the direction change processing in such away that an area of overlap between the image arrangement area and the print area in the acceleration/deceleration zone becomes smaller when the image arrangement area and the print area in the acceleration/deceleration zone overlap with each other both in the case where the direction change processing is executed and in the case where the direction change processing is not executed.

According to this configuration, when the image arrangement area and the print area in the acceleration/deceleration zone overlap with each other both in the case where the direction change processing is executed and in the case where the direction change processing is not executed, the overlap between the image arrangement area and the print area in the acceleration/deceleration zone can be reduced as much as possible. Therefore, printing the image during the printing in the acceleration/deceleration zone can be avoided as much as possible and uneven density in the printed image can be avoided as much as possible.

It is also preferable that the direction change decision unit decides whether or not to carryout the direction change processing in such a way that a difference between a density of a color in an overlapping area where the image arrangement area and the print area in the acceleration/deceleration zone overlap with each other, and a reference value, becomes greater when the image arrangement area and the print area in the acceleration/deceleration zone overlap with each other both in the case where the direction change processing is executed and in the case where the direction change processing is not executed.

According to this configuration, whether to carry out the direction change processing or not is decided in such away that the difference between the reference value at which uneven density tends to occur (tends to be visible) and the density of the color in the overlapping area becomes greater. Thus, even when the image arrangement area and the print area in the acceleration/deceleration zone overlap with each other both in the case where the direction change processing is executed and in the case where the direction change processing is not executed, the uneven density visually perceived by the user can be reduced.

In the print data generating device, it is preferable that the image arrangement area is an area where an image in a color of intermediate gradation is arranged.

According to this configuration, whether to carry out the direction change processing or not is decided in such a way that the image arrangement area where an image in a color of intermediate gradation in which uneven density tends to occur (tends to be visible) does not overlap with the print area in the acceleration/deceleration zone. Therefore, the uneven density visually perceived by the user can be effectively reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, the print data generating device, the printing device, the print data generating method and the program according to the invention will be described with reference to the accompanying drawings. In a first embodiment, a tape printer to which the print data generating device and the printing device according to the invention are applied will be described as an example. The tape printer is configured to perform print processing and cutting processing on a long print tape (continuous forms paper) and thus prepare a label.

Figure 1:
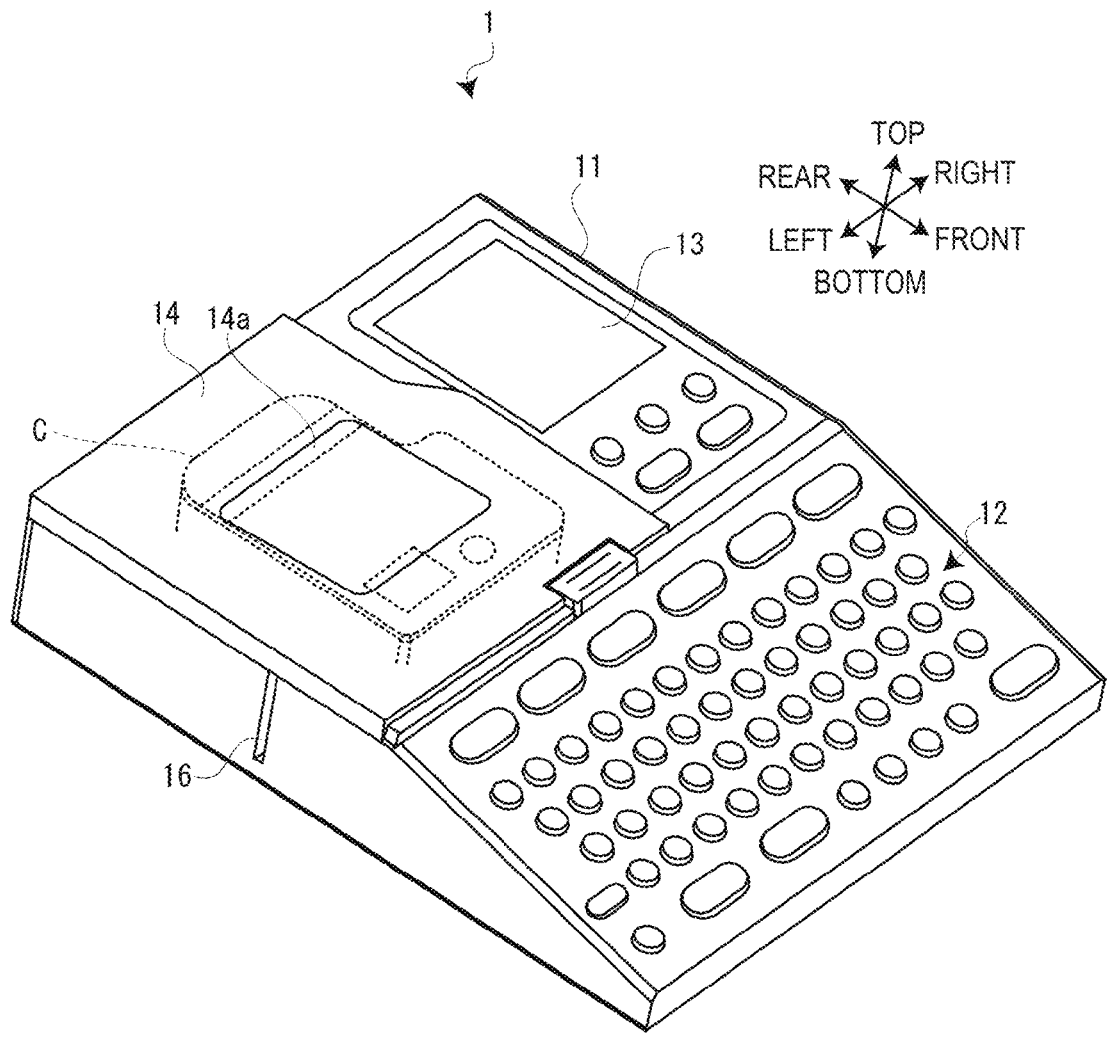
FIG. 1 is an outer perspective view showing a tape printer with its cover closed, according to a first embodiment.
Figure 2:
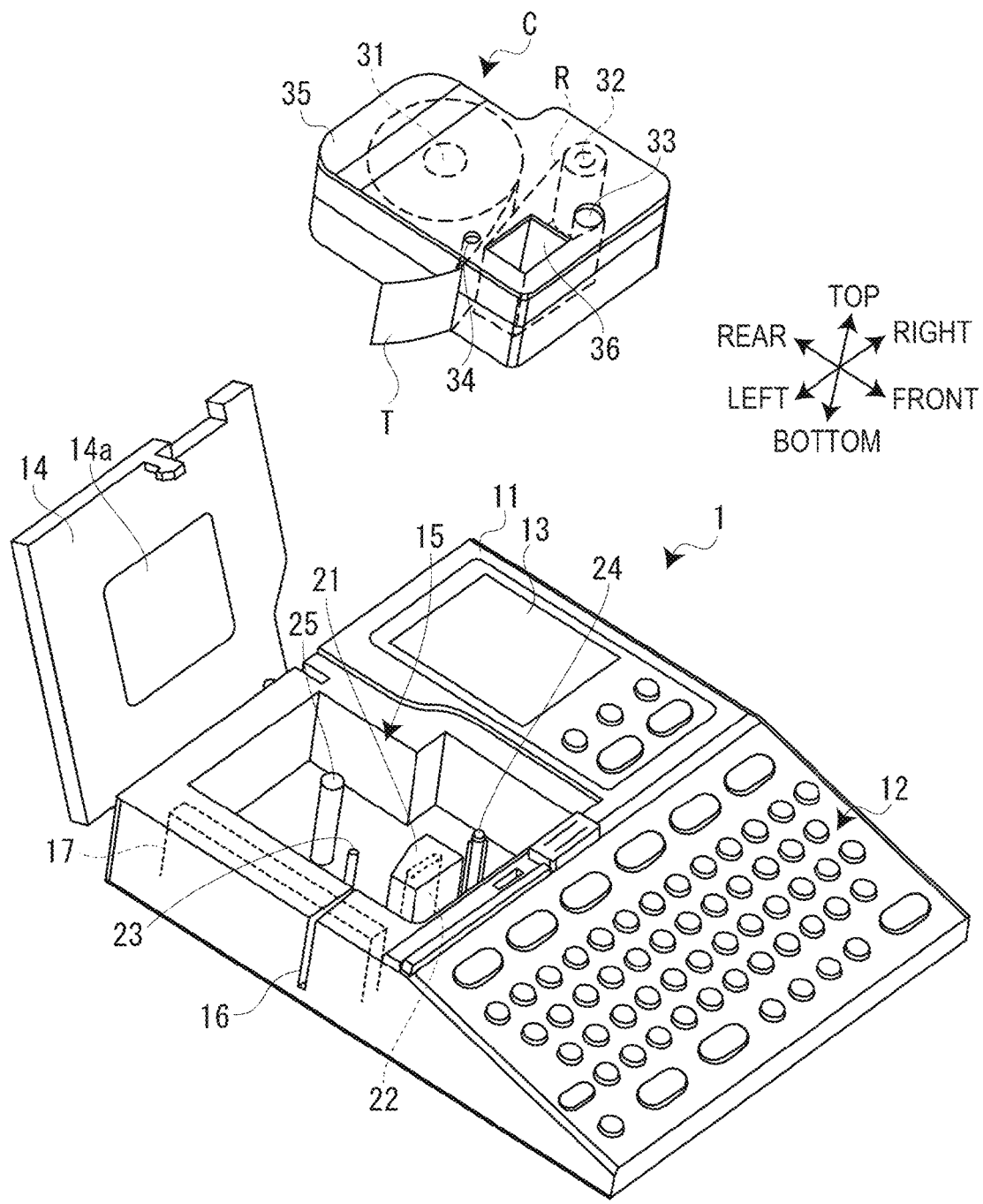
FIG. 2 is an outer perspective view showing the tape printer with its cover opened.

As shown in FIGS. 1 and 2, a tape printer 1 (printing device) has its exterior formed by a device case 11. A keyboard 12 including various input keys is arranged on a top surface of a front part of the device case 11. Also, a display 13 for displaying input results from the keyboard 12 is arranged on a top right surface of a rear part of the device case 11. Moreover, an open/close cover 14 is provided on a top left surface of the rear part of the device case 11.

Inside the open/close cover 14, a cartridge loading section 15 for loading a tape cartridge C is formed in the form of a recess. The tape cartridge C is removably loaded in the cartridge loading section 15 in the state where the open/close cover 14 is opened. In the open/close cover 14, a view window 14a for visually confirming loading/non-loading of the tape cartridge C in the state where the open/close cover 14 is closed is formed.

In a left lateral part of the device case 11, a tape discharge port 16 communicating the cartridge loading section 15 with the outside is formed. A tape cutter 17 (cutting unit) for cutting a print tape T that is fed out is present in the tape discharge port 16.

Meanwhile, as shown in FIG. 2, the cartridge loading section 15 has a print head 22 (line head) covered by a head cover 21, a platen drive shaft 23 facing the print head 22, a take-up drive shaft 24 fitted with a ribbon take-up reel 33, described later, and a positioning protrusion 25 for a tape reel 31, described later. Also, below the cartridge loading section 15, a tape feed motor 51 (see FIG. 3) for driving the platen drive shaft 23 and the take-up drive shaft 24 is provided inside. Moreover, a circuit board that forms a control mechanism 44 (see FIG. 3) for performing overall control of the tape printer 1 is incorporated inside the device case 11.

The print head 22 is formed by a thermal line head having a plurality of heat generation elements arrayed in an up-down direction. The print head 22 selectively drives each heat generation element and thus transfers the ink on an ink ribbon R to the print tape T on a dot basis.

The tape cartridge C has the tape reel 31 with the print tape T wound thereon, a ribbon reel 32 with the ink ribbon R wound thereon, the ribbon take-up reel 33 for taking up the ink ribbon R, a platen roller 34 facing the print head 22, and a cartridge case 35 accommodating these components. In the cartridge case 35, a head opening 36 in which the head cover 21 containing the print head 22 is inserted is formed, penetrating the cartridge case 35 in an up-down direction.

As the tape cartridge C is loaded in the cartridge loading section 15, the head cover 21 is inserted in the head opening 36, and the positioning protrusion 25 is inserted in the center hole of the tape reel 31. At the same time, the platen drive shaft 23 is fitted with the platen roller 34, and the take-up drive shaft 24 is fitted with the ribbon take-up reel 33. The print tape T is reeled off from the tape reel 31, then passes through the facing position between the print head 22 and the platen roller 34, is subsequently fed toward the tape discharge port 16, and fed out of the device through the tape discharge port 16 (tape feeding path). Meanwhile, the ink ribbon R is reeled off from the ribbon reel 32, then passes through the facing position between the print head 22 and the platen roller 34, subsequently goes around the circumferential wall of the head opening 36, and is taken up by the ribbon take-up reel 33 (ribbon feeding path). In this way, the print tape T and the ink ribbon R are superimposed on each other at the facing position between the print head 22 and the platen roller 34.

If the platen drive shaft 23 and the take-up drive shaft 24 are rotationally driven in the state where the tape cartridge C is loaded in the cartridge loading section 15, the platen roller 34 and the ribbon take-up reel 33 rotate, thus causing the print tape T to be fed along the tape feeding path and causing the ink ribbon R to be fed along the ribbon feeding path. Each heat generation element of the print head 22 is selectively driven to generate heat synchronously with this feeding operation, thus transferring the ink on the ink ribbon R to the print tape T that is fed, so as to perform desired printing. Also, the feeding of the print tape T is temporarily stopped and the tape cutter 17 is driven to cut the print tape T. By this print processing and cutting processing, a label is prepared.

Figure 3:
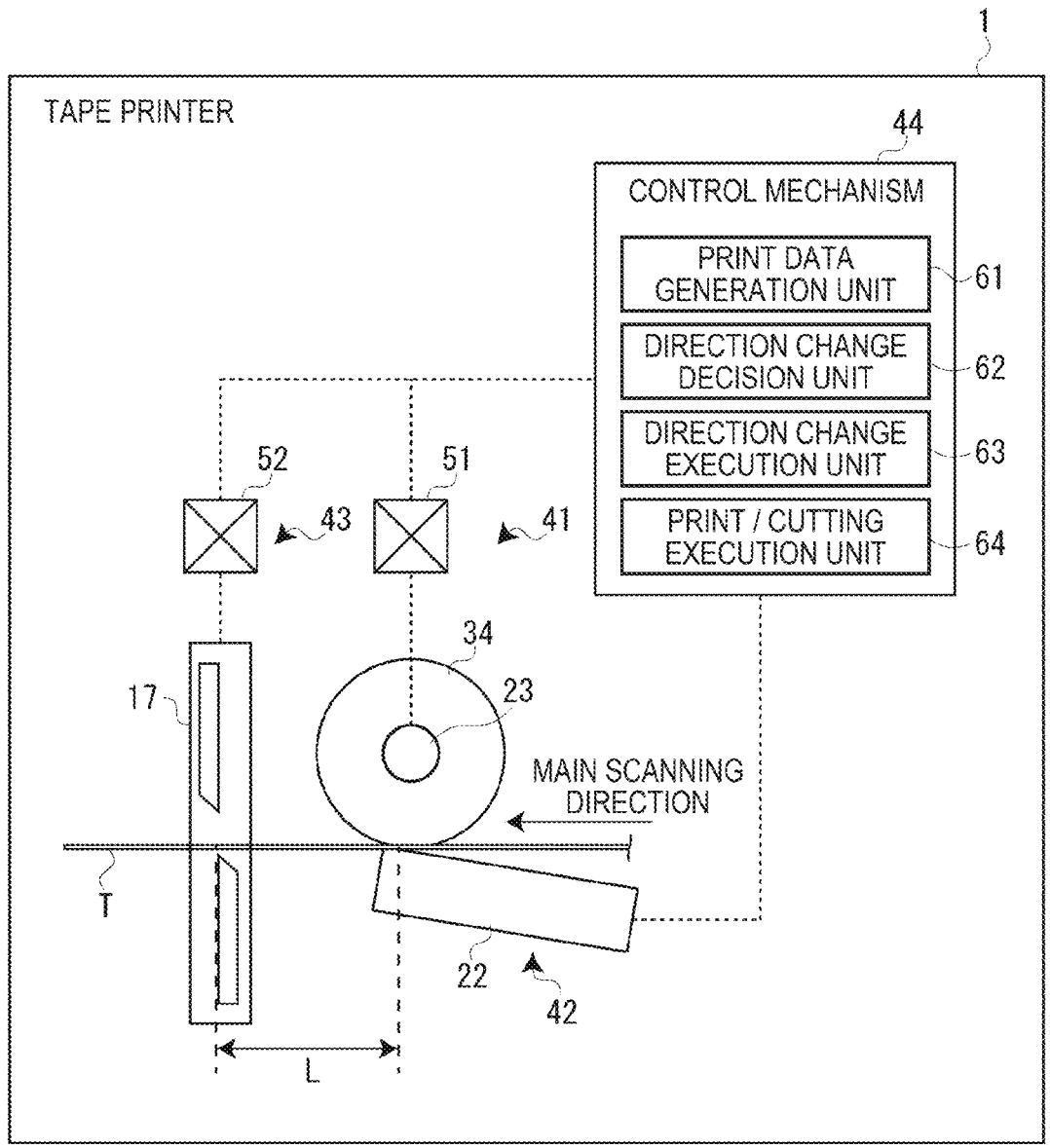
FIG. 3 is a schematic view showing the control configuration of the tape printer.

Next, the control configuration of the tape printer 1 will be described with reference to FIG. 3. As shown in FIG. 3, the tape printer 1 has a feeding mechanism 41 (feeding unit), a printing mechanism 42, a cutting mechanism 43, and the control mechanism 44 for controlling these mechanisms. The "print data generating device" is made up of the control mechanism 44.

The feeding mechanism 41 is made up of the platen roller 34, the platen drive shaft 23, and the tape feed motor 51 for driving the platen drive shaft 23, and feeds the print tape T along the tape feeding path while drawing the print tape T from the tape reel 31. That is, the feeding mechanism 41 feeds the print tape T in a main scanning direction.

The printing mechanism 42 is made up of the print head 22, which is a line head orthogonal to the main scanning direction. The printing mechanism 42 performs print processing on the print tape T fed in the main scanning direction by the feeding mechanism 41. That is, the printing mechanism 42 selectively drives each heat generation element of the print head 22 to generate heat and thus transfers the ink on the ink ribbon R to the print tape T fed in the main scanning direction. As each heat generation element of the print head 22 is thus selectively driven to generate heat synchronously with the feeding of the print tape T by the feeding mechanism 41, printing is performed on the print tape T.

The cutting mechanism 43 is made up of the tape cutter 17 and a cutter motor 52 for driving the tape cutter 17, and cuts the print tape T. In this embodiment, the print tape T is cut as the tape cutter 17 is driven in the state where the feeding of the print tape T by the feeding mechanism 41 is temporarily stopped. As shown in FIG. 3, the tape cutter 17 is arranged downstream of the print head 22 in the main scanning direction. Therefore, the cutting mechanism 43 is configured to cut the print tape T downstream of the print head 22 in the main scanning direction.

The control mechanism 44 has a CPU (central processing unit), a ROM (read only memory), a RAM (random access memory) and the like, and performs overall control of the entire tape printer 1. The control mechanism 44 functions as a print data generation unit 61, a direction change decision unit 62, a direction change execution unit 63, and a print/cutting execution unit 64, using various programs.

The print data generation unit 61 generates print data. For example, the print data generation unit 61 generates print data including a print image G in response to editing processing on the print image G or setting processing of various settings by user operations. The print image G of the print data generated here includes, for example, a letter string and an image (picture) (see FIGS. 6A to 6D).

The direction change decision unit 62 decides whether or not to carry out direction change processing of changing the direction in which the print image G of the print data is printed (hereinafter referred to as a print direction). That is, the direction change decision unit 62 makes a decision about whether to carry out the direction change processing or not. The direction change processing is the processing of rotating the print image G by 180 degrees and thus changing the print direction of the print image G by 180 degrees. As will be described in detail later, the direction change decision unit 62 decides whether to carry out the direction change processing or not, according to the position of an image arrangement area A1 (area where the image is arranged) on the print image G.

The direction change execution unit 63 executes the direction change processing on the print data if the direction change decision unit 62 decides to carry out the direction change processing. That is, the direction change execution unit 63 rotates the print image G of the print data by 180 degrees and thus changes the print direction of the print image G by 180 degrees.

The print/cutting execution unit 64 carries out print processing and cutting processing based on the print data. That is, the print/cutting execution unit 64 controls the feeding mechanism 41, the printing mechanism 42 and the cutting mechanism 43 on the basis of the print data and thus carries out print processing and cutting processing on the print tape T.

Figure 4A:
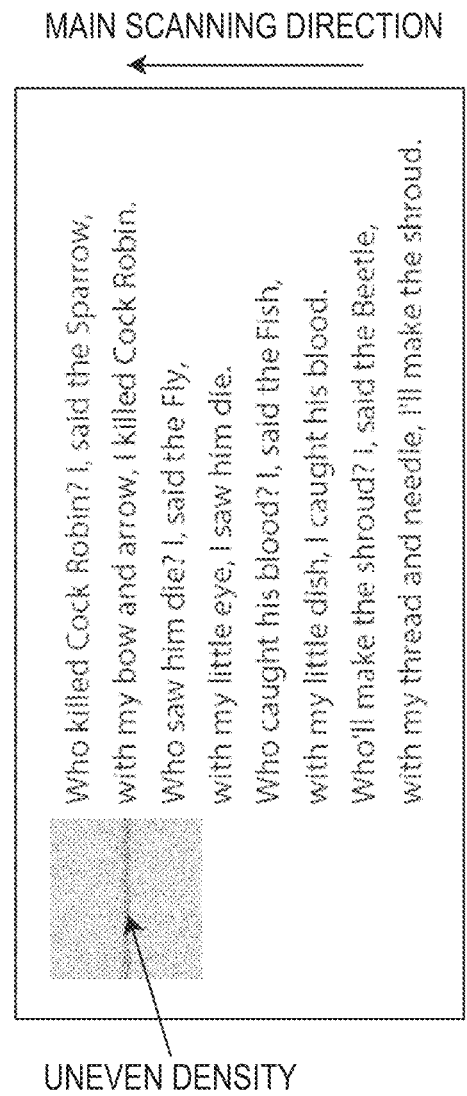
FIGS. 4A and 4B show print results in the case where an image arrangement area and a print area in an acceleration/deceleration zone overlap with each other.
Figure 4B:
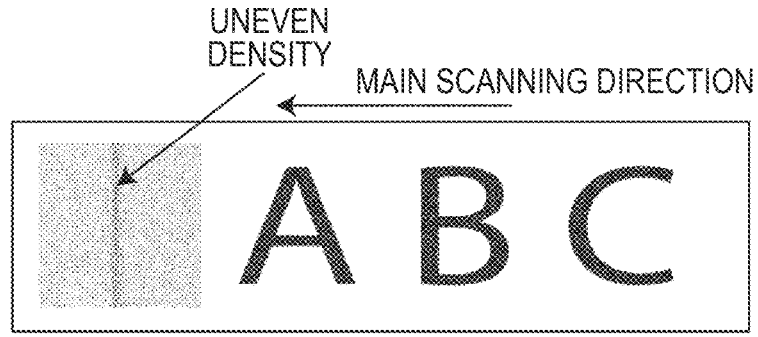

Meanwhile, in this embodiment, the cutting processing is carried out in the state where the feeding of the print tape T is temporarily stopped during the printing of the print image G, so that a forward end margin due to the distance from the print position of the print head 22 to the cutting position of the tape cutter 17 (hereinafter referred to as a head-cutter distance L) will not be generated. That is, after the print image G is printed by a predetermined amount corresponding to the head-cutter distance L, the feeding of the print tape T is temporarily stopped to carry out the cutting processing, and subsequently the remaining part of the print image G is printed. However, when printing is carried out by this method, since the feeding of the print tape T is temporarily stopped so as to carry out the cutting processing, during the printing of the print image the print processing is also carried out in a deceleration zone generated at the time of stopping the feeding. If an image is arranged in a print area A2 where printing is performed in this deceleration zone (hereinafter referred to as a deceleration-zone print area A2), uneven density is generated in the printed image, as shown in FIG. 4B.

In contrast, in this embodiment, the direction change decision unit 62 decides whether to carry out the direction change processing or not, in such a way as to prevent an overlap between the image arrangement area A1 and the deceleration-zone print area A2 as much as possible. Thus, uneven density is prevented from occurring in the image on the print image G. As will be described in detail later, the direction change decision unit 62 decides whether to carry out the direction change processing or not, in such a way that the image arrangement area A1 and the deceleration-zone print area A2 do not overlap with each other. Also, when the image arrangement area A1 and the deceleration-zone print area A2 overlap with each other both in the case where the direction change processing is executed and in the case where the direction change processing is not executed, the direction change decision unit 62 decides whether to carry out the direction change processing or not, in such a way as to minimize the area of overlap between the image arrangement area A1 and the deceleration-zone print area A2.

Here, the print operation by the tape printer 1 including the processing by the direction change decision unit 62 to decide whether to carry out the direction change processing or not will be described with reference to FIG. 5. This print operation is executed after the editing processing on the print image G and the setting processing of various settings by user operations are carried out.

Figure 5:
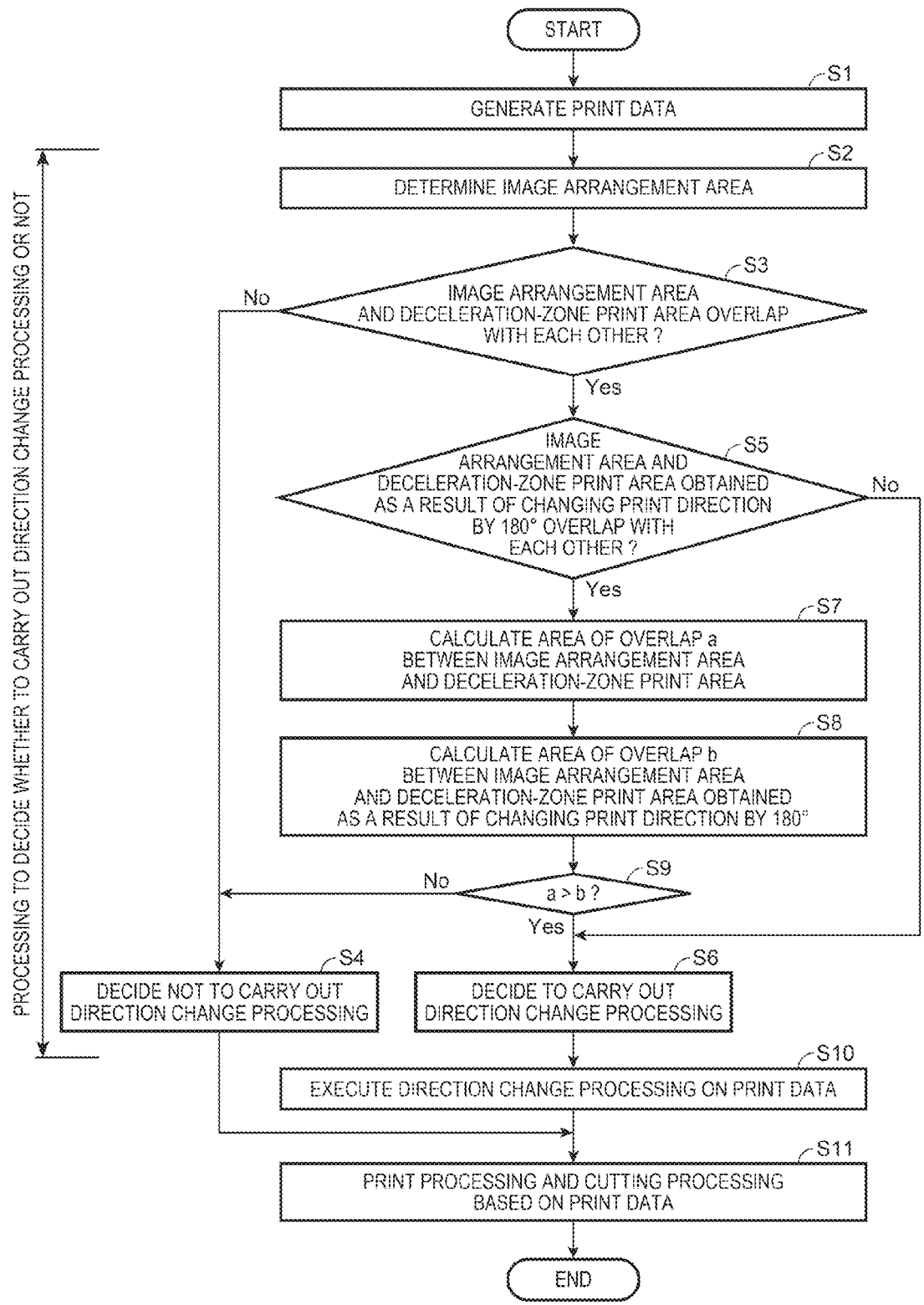
FIG. 5 is a flowchart showing the print operation by the tape printer.

As shown in FIG. 5, in this print operation, first, the print data generation unit 61 generates print data (S1). That is, print data including the print image G is generated on the basis of the editing result of the editing processing and the setting result of the setting processing.

After the print data is generated, the direction change decision unit 62 carries out processing to decide whether to carry out the direction change processing or not (S2 to S9) (direction change decision step). Specifically, the generated print data is analyzed and the image arrangement area A1 on the print image G of the print data is determined (S2). That is, which position on the print image G the image arrangement area A1 is located at is determined.

After the image arrangement area A1 is determined, whether the determined image arrangement area A1 and the deceleration-zone print area A2 overlap with each other or not is determined (S3). In this embodiment, since the length of the deceleration zone is substantially the same as the head-cutter distance L, the deceleration-zone print area A2 is an area extending rearward from the forward end of the print image G by the amount of the head-cutter distance L (see FIGS. 6A to 6D). That is, in this process, whether or not the image arrangement area A1 overlaps with the area extending rearward from the forward end of the print image G by the amount of the head-cutter distance L is determined.

Figure 6A:
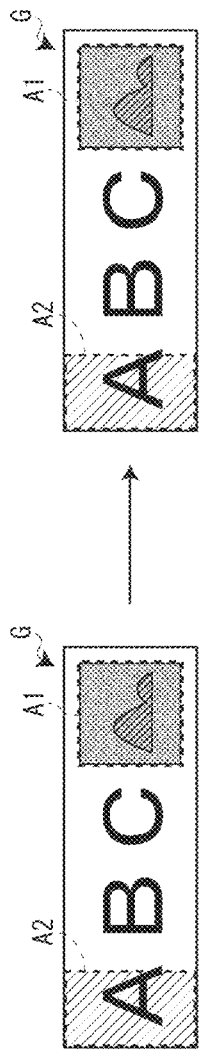
FIGS. 6A to 6D are explanatory views for explaining processing to decide whether to carry out direction change processing or not, in the first embodiment.

If it is determined as a result that the image arrangement area A1 and the deceleration-zone print area A2 do not overlap with each other (S3: No), it is understood that the image arrangement area A1 and the deceleration-zone print area A2 do not overlap with each other at present, that is, in the state where the direction change processing is not executed, as shown in FIG. 6A. Therefore, it is determined that the direction change processing is not necessary, and a decision not to carry out the direction change processing is made (S4).

Meanwhile, if it is determined as a result that the image arrangement area A1 and the deceleration-zone print area A2 overlap with each other (S3: Yes), then it is determined whether the image arrangement area A1 and a deceleration-zone print area A2' obtained as a result of changing the print direction of the print image G by 180 degrees overlap with each other or not (S5). That is, whether or not the image arrangement area A1 overlaps with an area extending forward from the rear end of the print image G by the amount of the head-cutter distance L is determined.

Figure 6B:
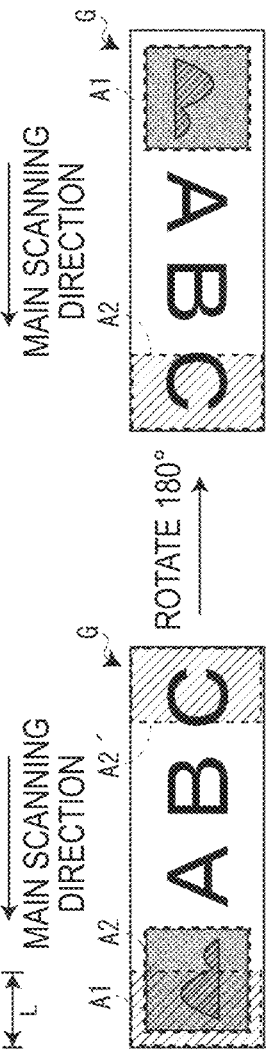

If it is determined as a result that the image arrangement area A1 and the deceleration-zone print area A2' obtained as a result of changing the print direction of the print image G by 180 degrees do not overlap with each other (S5: No), it is understood that the image arrangement area A1 and the deceleration-zone print area A2 do not overlap with each other in the state where the direction change processing is executed, as shown in FIG. 6B. Therefore, it is determined that the direction change processing is necessary, and a decision to carry out the direction change processing is made (S6).

Figure 6C:
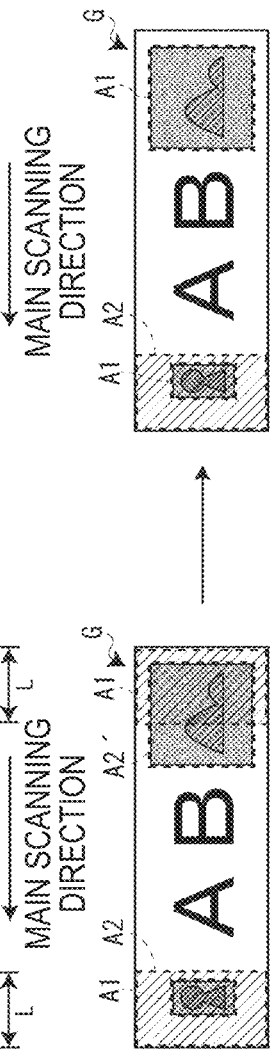
Figure 6D:
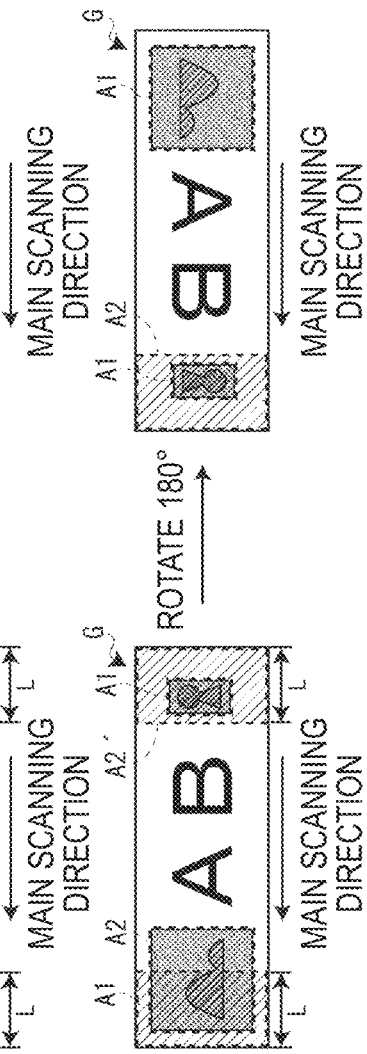

Meanwhile, if it is determined as a result that the image arrangement area A1 and the deceleration-zone print area A2' obtained as a result of changing the print direction of the print image G by 180 degrees overlap with each other (S5: Yes), it is understood that the image arrangement area A1 and the deceleration-zone print area A2 overlap with each other both in the case where the direction change processing is executed and in the case where the direction change processing is not executed, as shown in FIGS. 6C and 6D. Therefore, this time, in which of the case where the direction change processing is executed and the case where the direction change processing is not executed, an area of overlap a between the image arrangement area A1 and the deceleration-zone print area A2 is smaller, is determined (S7 to S9). Specifically, first, the area of overlap a between the image arrangement area A1 and the deceleration-zone print area A2 is calculated (S7). Next, an area of overlap b between the image arrangement area A1 and the deceleration-zone print area A2' obtained as a result of changing the print direction of the print image G by 180 degrees is calculated (S8). Then, whether the former area of overlap a is greater than the latter area of overlap b or not is determined (S9).

If it is determined as a result that the former area of overlap a is not greater than the latter area of overlap b (equal to or smaller than the latter area of overlap) (S9: No), it is understood that the area of overlap between the image arrangement area A1 and the deceleration-zone print area A2 is smaller in the case where the direction change processing is not executed than in the case where the direction change processing is executed, as shown in FIG. 6C. Therefore, it is determined that the direction change processing is not necessary, and a decision not to carry out the direction change processing is made (S4).

Meanwhile, if it is determined as a result that the former area of overlap a is greater than the latter area of overlap b (S9: Yes), it is understood that the area of overlap between the image arrangement area A1 and the deceleration-zone print area A2 is smaller in the case where the direction change processing is executed than in the case where the direction change processing is not executed, as shown in FIG. 6D. Therefore, it is determined that the direction change processing is necessary, and a decision to carry out the direction change processing is made (S6).

After the decision processing by the direction change decision unit 62 is finished, the direction change execution unit 63 executes the direction change processing according to the result of the decision (direction change execution step). That is, if a decision to carry out the direction change processing is made (S6), the direction change processing is executed on the print data generated by the print data generation unit 61 (S10). Meanwhile, if a decision not to carry out the direction change processing is made (S4), the processing shifts to the next process without executing the direction change processing.

After the direction change processing according to the decision by the direction change decision unit 62 is finished, the print processing and the cutting processing are executed on the basis of the print data (S11). That is, if the direction change processing by the direction change execution unit 63 is not executed, the print processing and the cutting processing are executed on the basis of the print data generated by the print data generation unit 61 as it is. Meanwhile, if the direction change processing by the direction change execution unit 63 is executed, the print processing and the cutting processing are executed on the basis of the print data obtained by rotating the print image by 180 degrees from the print data generated by the print data generation unit 61. A label is thus prepared and the print operation ends.

Second Embodiment

Next, a second embodiment of the invention will be described with reference to FIGS. 7 to 10. In the second embodiment, a print system 101 to which the print data generating device according to the invention is applied is described as an example. That is, in the second embodiment, the print data generating device according to the invention in the case of being applied to a host computer 111 in the print system 101 is described as an example.

Figure 7:
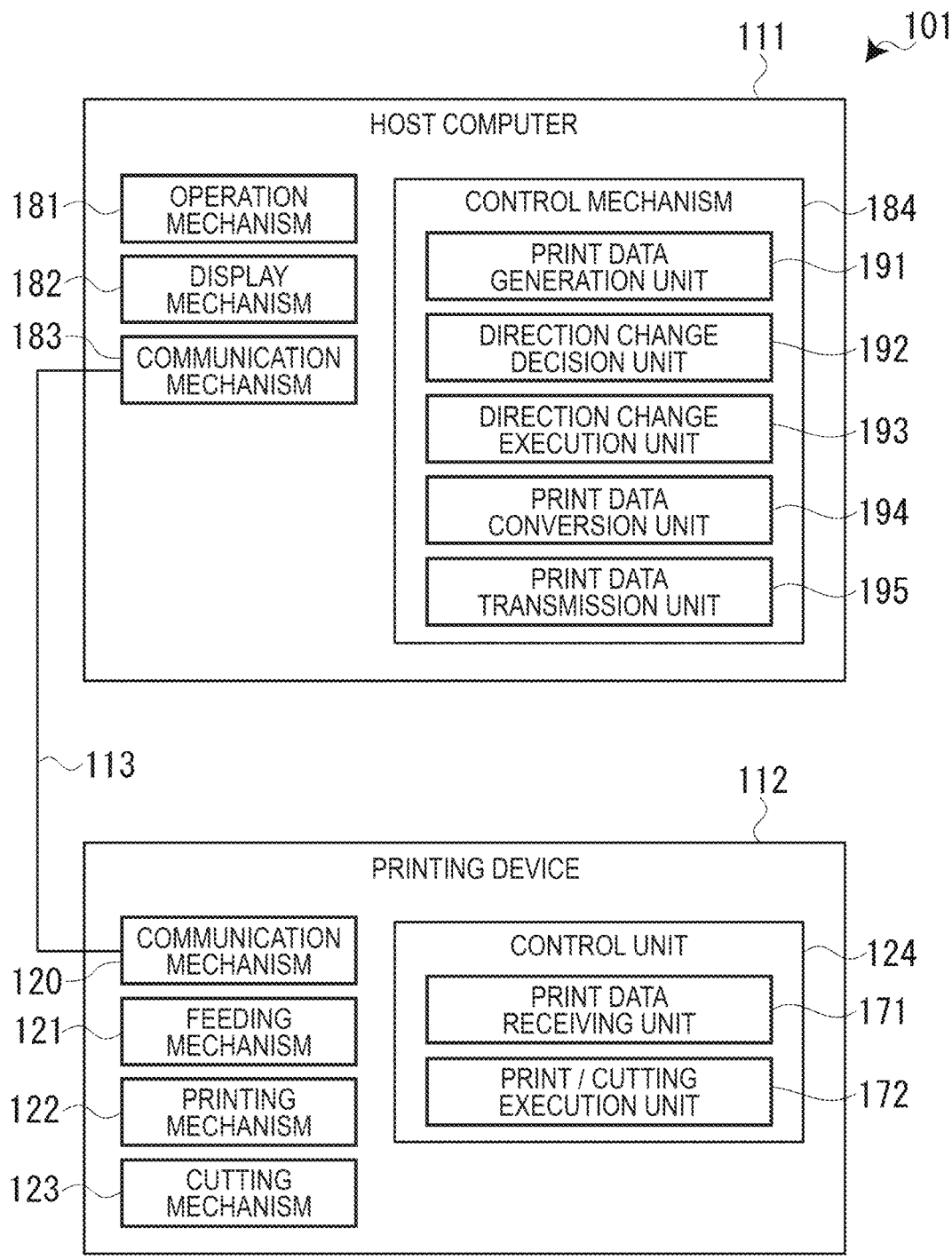
FIG. 7 shows the system configuration of a print system according to a second embodiment.

As shown in FIG. 7, the print system 101 has the host computer 111 (print data generating device) which generates print data, and a paper roll printer 112 (printing device) which performs print processing on a paper roll S (continuous forms paper) wound on a reel 133, on the basis of the print data from the host computer 111. The host computer 111 and the paper roll printer 112 are connected together via a cable 113 and are configured to be able to transmit and receive various data to and from each other via wired communication. While the host computer 111 and the paper roll printer 112 in this embodiment are connected via wired communication, the host computer 111 and the paper roll printer 112 may be configured to be connected via wireless communication. Alternatively, the host computer 111 and the paper roll printer 112 may be configured to be directly connected, or the host computer 111 and the paper roll printer 112 may be configured to be connected via a network (the internet or a local area network).

The paper roll printer 112 includes a communication mechanism 120, a feeding mechanism 121 (feeding unit), a printing mechanism 122, a cutting mechanism 123, and a control mechanism 124. The communication mechanism 120 communicates with the host computer 111.

Figure 8:
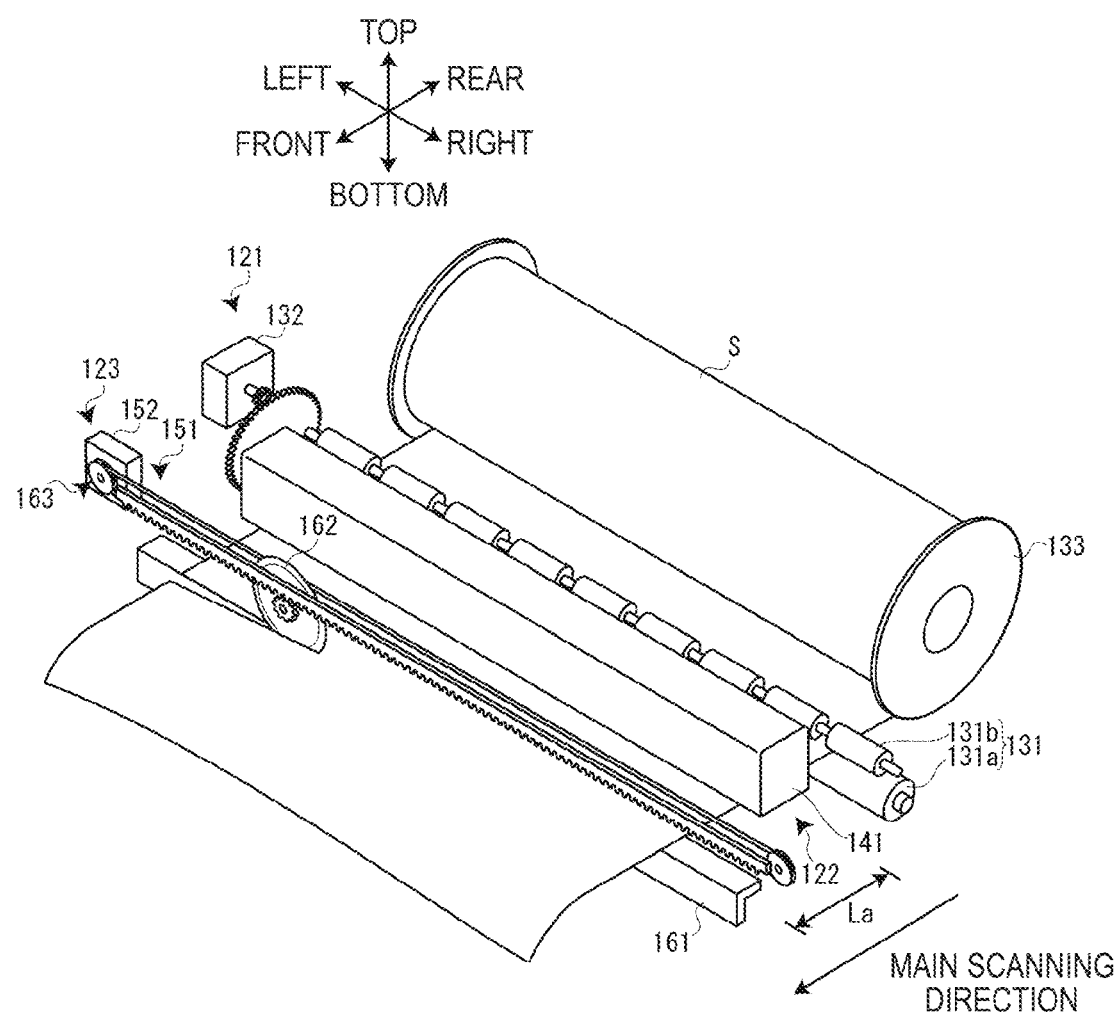
FIG. 8 is a perspective view showing the internal structure of a paper roll printer.

As shown in FIG. 8, the feeding mechanism 121 is made up of a sheet feed roller 131 and a sheet feed motor 132 which drives the sheet feed roller 131. The feeding mechanism 121 fees the paper roll S in a main scanning direction while drawing the paper roll S from the reel 133. The sheet feed roller 131 is made up of nip rollers including a drive roller 131a at the bottom and a driven roller 131b at the top. The sheet feed motor 132 is connected to the drive roller 131a.

The printing mechanism 122 is made up of a print head 141 (line head) and performs print processing on the paper roll S fed in the main scanning direction by the feeding mechanism 121. The print head 141 has a plurality of ejection nozzles arrayed in a direction orthogonal to the main scanning direction. That is, the print head 141 is made up of an inkjet line head. The print head 141 selectively ejects ink from each ejection nozzle and thus performs print processing on the paper roll S. In the print head 141, a plurality of nozzle arrays orthogonal to the main scanning direction may be provided parallel to each other in the main scanning direction, or a plurality of inkjet heads may be arrayed in a zigzag form in a direction orthogonal to the main scanning direction, thus forming a line head.

The cutting mechanism 123 includes a sheet cutter 151 (cutting unit) and a cutter motor 152 which drives the sheet cutter 151. The cutting mechanism 123 cuts the paper roll S. The sheet cutter 151 includes a lower edge 161 at the bottom, a rotary edge 162 at the top facing the lower edge 161, and a rotary edge moving mechanism 163 which reciprocates the rotary edge 162 in directions orthogonal to the main scanning direction. In this embodiment, the paper roll S is cut as the sheet cutter 151 is driven (the rotary edge 162 is moved forward or backward) in the state where the feeding of the paper roll S by the feeding mechanism 121 is temporarily stopped. As in the first embodiment, the sheet cutter 151 is arranged downstream of the print head 141 in the main scanning direction. Therefore, the cutting mechanism 123 is configured to cut the paper roll S downstream of the print head 141 in the main scanning direction.

The control mechanism 124 includes a CPU, a ROM, a RAM and the like and performs overall control of the entire paper roll printer 112. As shown in FIG. 7, the control mechanism 124 functions as a print data receiving unit 171 and a print/cutting execution unit 172, using various programs. The print data receiving unit 171 controls the communication mechanism 120 and receives print data from the host computer 111. The print/cutting execution unit 172 controls the feeding mechanism 121, the printing mechanism 122 and the cutting mechanism 123 on the basis of the print data and performs print processing and cutting processing on the paper roll S.

Also in the second embodiment, the cutting processing is carried out in the state where the feeding of the paper roll S is temporarily stopped during the printing of the print image G, so that a forward end margin due to the distance from the print position of the print head 141 to the cutting position of the sheet cutter 151 (hereinafter referred to as a head-cutter distance La) will not be generated. That is, after the print image G is printed by a predetermined amount corresponding to the head-cutter distance La, the feeding of the paper roll S is temporarily stopped to perform the cutting processing, and subsequently the remaining part of the print image G is printed.

Meanwhile, the host computer 111 can be an ordinary personal computer and includes an operation mechanism 181, a display mechanism 182, a communication mechanism 183, and a control mechanism 184. The operation mechanism 181 includes a mouse, a keyboard and the like and accepts various user operations. The display mechanism 182 is made up of a display or the like and displays various kinds of information. The communication mechanism 183 communicates with the paper roll printer 112.

The control mechanism 184 has a CPU, a ROM, a RAM and the like and performs overall control of the entire host computer 111. The control mechanism 184 functions as a print data generation unit 191, a direction change decision unit 192, a direction change execution unit 193, a print data conversion unit 194, and a print data transmission unit 195, using various programs (print data generation application and printer driver). The print data generation unit 191, the direction change decision unit 192 and the direction change execution unit 193 are similar to those described in the first embodiment (print data generation unit 61, direction change decision unit 62, and direction change execution unit 63).

The print data conversion unit 194 converts the print data into a page description language printable by the paper roll printer 112. The print data transmission unit 195 controls the communication mechanism 183 and transmits the print data converted into the page description language by the print data conversion unit 194, to the paper roll printer 112.

Next, the print operation by the print system 101 will be described with reference to FIG. 9. This print operation is executed in the state where editing processing on the print image G and setting processing of various settings by user operations have been carried out.

Figure 9:
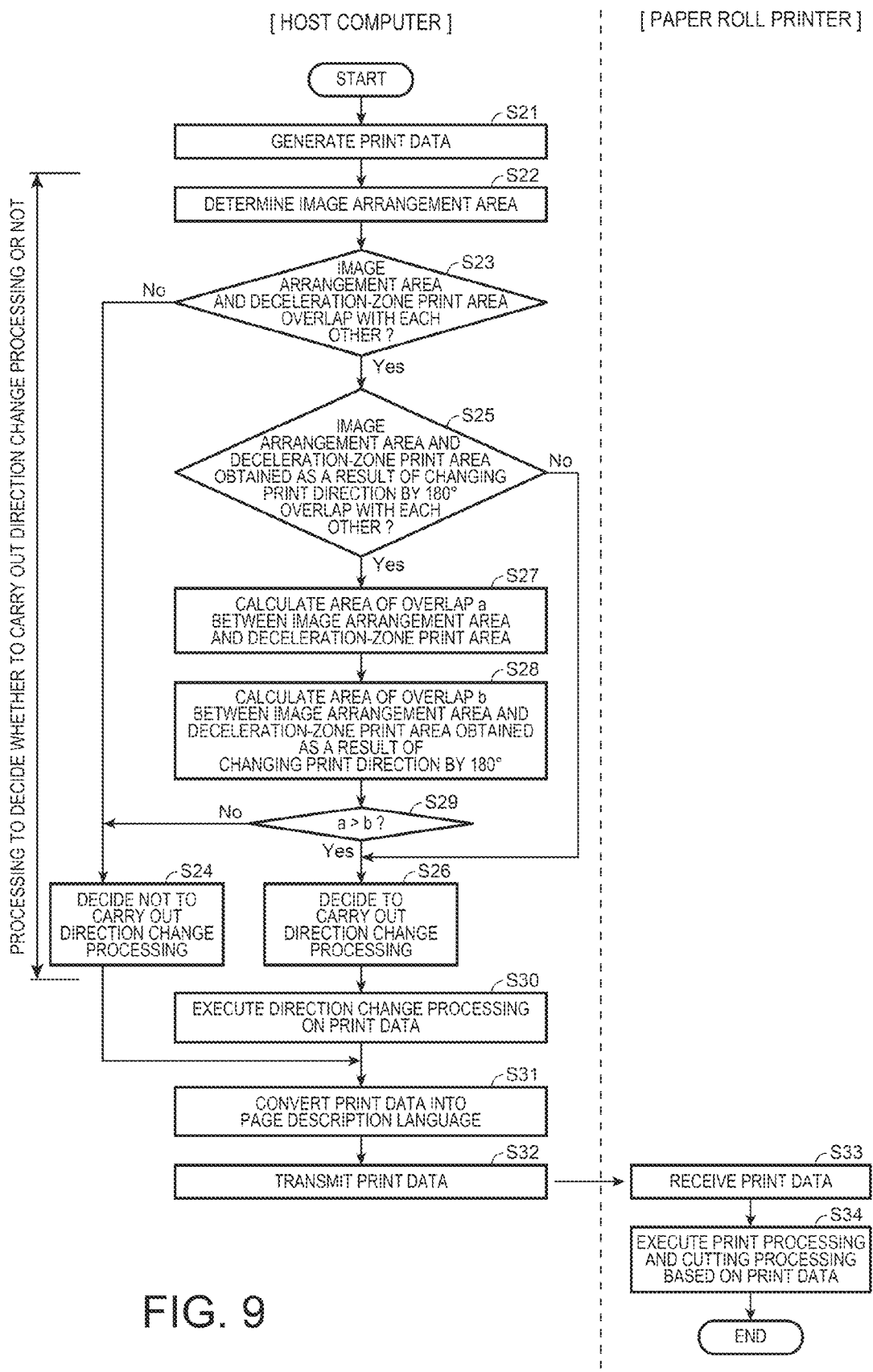
FIG. 9 is a flowchart showing the print operation by the print system.
Figure 10A:
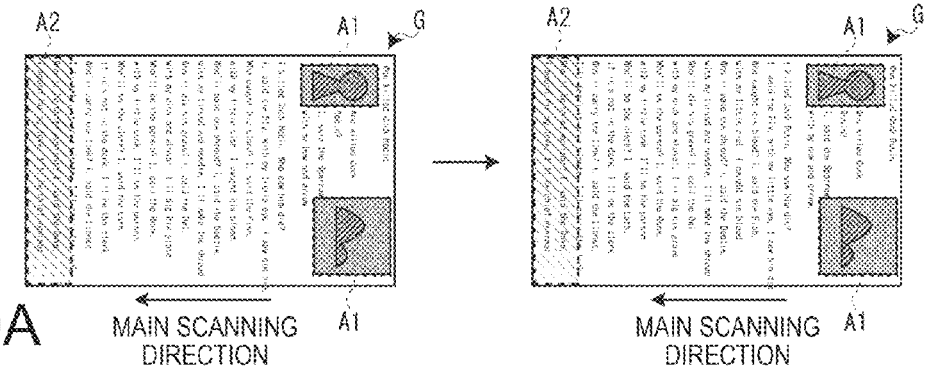
FIGS. 10A to 10D are explanatory views for explaining processing to decide whether to carry out direction change processing or not, in the second embodiment.
Figure 10B:
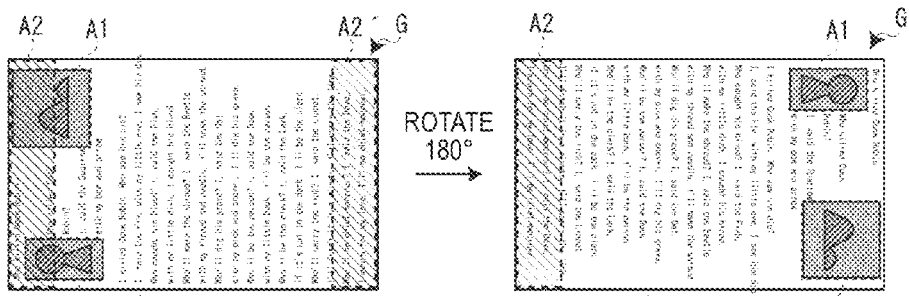
Figure 10C:
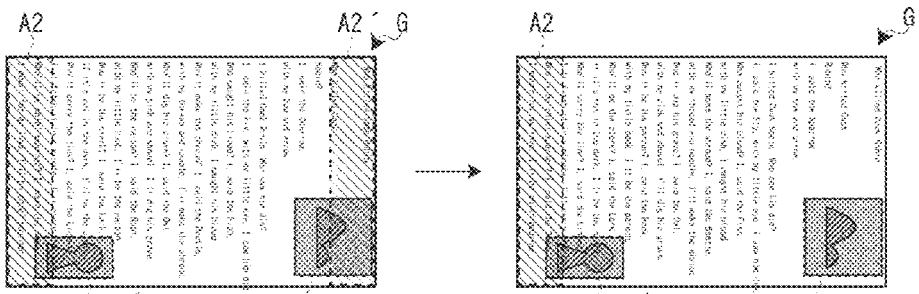
Figure 10D:
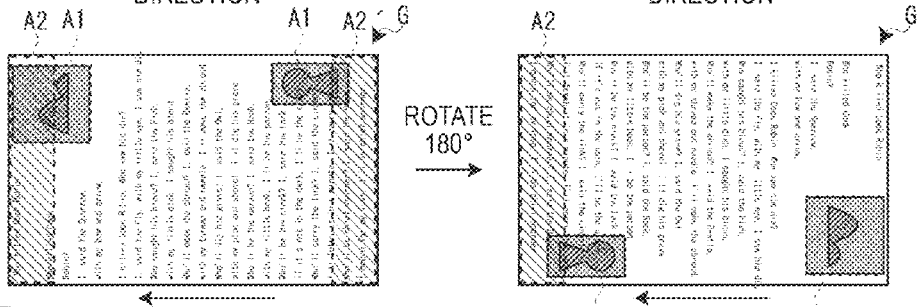

As shown in FIG. 9, in this print operation, first, the print data generation unit 191 in the host computer 111 generates print data (S21). That is, print data including the print image G is generated on the basis of the editing result of the editing processing and the setting result of the setting processing.

After the print data is generated, the direction change decision unit 192 carries out processing to decide whether to carry out the direction change processing or not (S22 to S29) (direction change decision step). In this decision processing, as in the first embodiment, first, the image arrangement area A1 on the print image G of the generated print data is determined (S22) and whether the determined image arrangement area A1 and the deceleration-zone print area A2 overlap with each other or not is determined (S23). The deceleration-zone print area A2 is an area extending rearward from the forward end of the print image G by the amount of the head-cutter distance La, as in the first embodiment. However, to be more precise, the deceleration-zone print area A2 is an area extending from the forward end of the print image G by the amount of the distance from the cutting position of the sheet cutter 151 to the print position (impact point) of the farthest ejection nozzle from the cutting position, in the print head 141.

If it is determined that the image arrangement area A1 and the deceleration-zone print area A2 do not overlap with each other (S23: No), a decision not to carry out the direction change processing is made (S24) (see FIG. 10A). Meanwhile, if it is determined that the image arrangement area A1 and the deceleration-zone print area A2 overlap with each other (S23: Yes), then it is determined whether the image arrangement area A1 and the deceleration-zone print area A2' obtained as a result of changing the print direction of the print image G by 180 degrees overlap with each other or not (S25). If it is determined that the image arrangement area A1 and the deceleration-zone print area A2' obtained as a result of changing the print direction of the print image G by 180 degrees do not overlap with each other (S25: No), a decision to carry out the direction change processing is made (S26) (see FIG. 10B).

Meanwhile, if it is determined that the image arrangement area A1 and the deceleration-zone print area A2' obtained as a result of changing the print direction of the print image G by 180 degrees overlap with each other (S25: Yes), the area of overlap a between the image arrangement area A1 and the deceleration-zone print area A2 is calculated (S27) and the area of overlap b between the image arrangement area A1 and the deceleration-zone print area A2' obtained as a result of changing the print direction of the print image G by 180 degrees is calculated (S28). Then, whether the former area of overlap a is greater than the latter area of overlap b or not is determined (S29). If it is determined the former area of overlap a is not greater than the latter area of overlap b (S29: No), a decision not to carry out the direction change processing is made (S24) (see FIG. 10C). If it is determined that the former area of overlap a is greater than the latter area of overlap b (S29: Yes), a decision to carry out the direction change processing is made (S26) (see FIG. 10D).

After the decision processing by the direction change decision unit 192 is finished, the direction change execution unit 193 executes the direction change processing according to the result of the decision (direction change execution step), as in the first embodiment. That is, if a decision to carry out the direction change processing is made (S26), the direction change processing is executed on the print data generated by the print data generation unit 191 (S30). If a decision not to carry out the direction change processing is made (S24), the processing shifts to the next process without executing the direction change processing.

After the direction change processing according to the decision by the direction change decision unit 192 is finished, the print data conversion unit 194 converts the print data into a page description language printable by the paper roll printer 112 (S31). Subsequently, the print data transmission unit 195 transmits the print data converted into the page description language, to the paper roll printer 112 (S32). In response to this, in the paper roll printer 112, the print data receiving unit 171 receives the print data from the host computer 111 (S33) and the print/cutting execution unit 172 carries out print processing and cutting processing on the paper roll S on the basis of the received print data (S34). A printed material is thus prepared and the print operation ends.

According to each of the embodiments described above, printing an image during the printing in a deceleration zone can be avoided as much as possible. Thus, the occurrence of uneven density in the printed image can be avoided as much as possible. Thus, uneven density on the image on the print image G can be reduced with a simple configuration without feeding the continuous forms paper (print tape T and paper roll S) backward, or the like.

Figure 11:
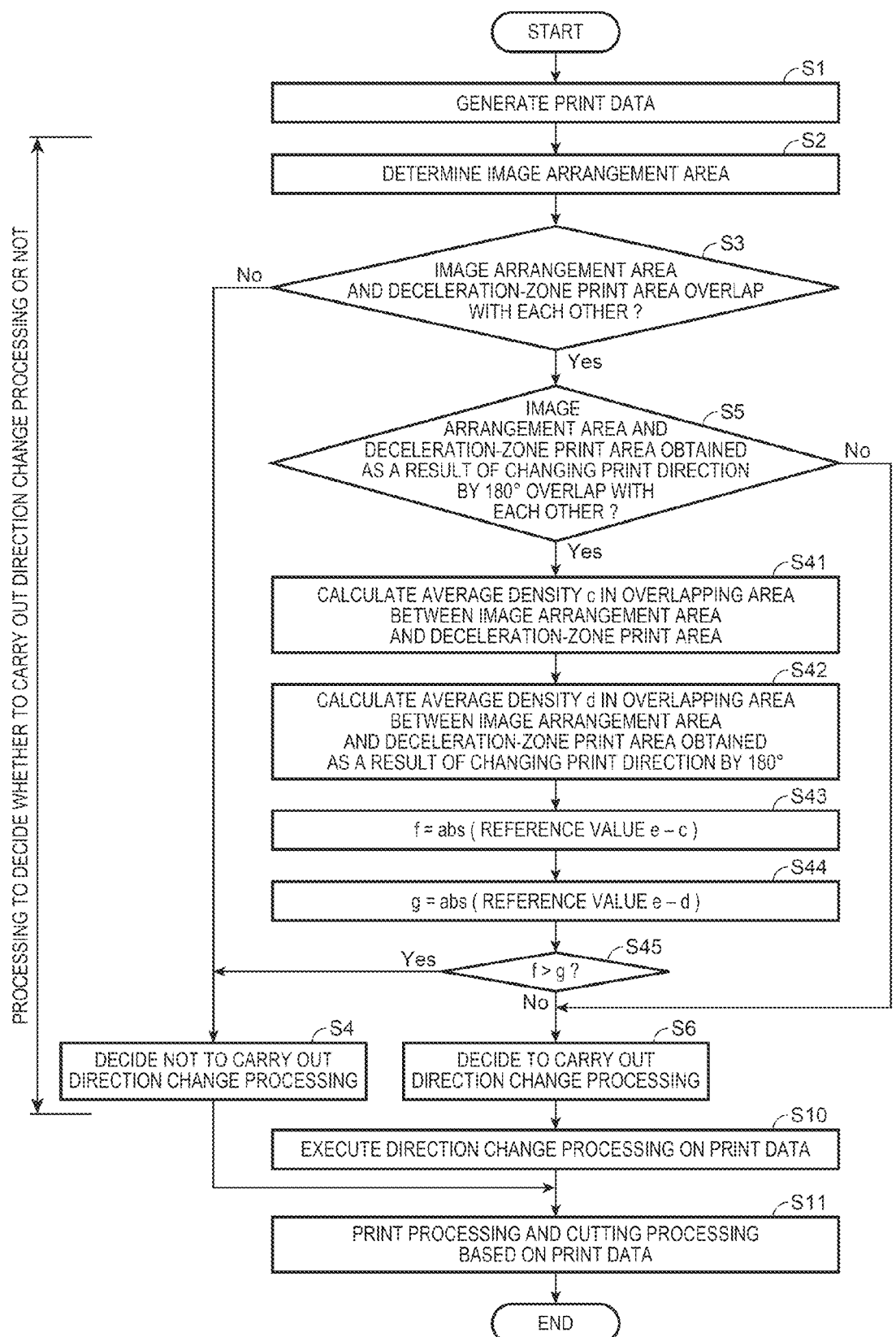
FIG. 11 is a flowchart showing a first modification of the print operation by the tape printer.

In each of the embodiments, when the image arrangement area A1 and the deceleration-zone print area A2 overlap with each other both in the case where the direction change processing is executed and in the case where the direction change processing is not executed, whether to carry out direction change processing or not is decided on the basis of the area of overlap. However, this is not limiting. For example, whether to carry out the direction change processing or not may be decided on the basis of the density of the color in the overlapping area between the image arrangement area A1 and the deceleration-zone print area A2. Specifically, whether to carry out the direction change processing or not is decided in such a way that the difference between the density and a reference value at which uneven density tends to be visible becomes greater. For example, as shown in FIG. 11, an average density c in the overlapping area between the image arrangement area A1 and the deceleration-zone print area A2 is calculated (S41). Subsequently, an average density d in the overlapping area between the image arrangement area A1 and the deceleration-zone print area A2' obtained as a result of changing the print direction of the print image G by 180 degrees is calculated (S42). Then, a difference f between a reference value e and the former average density c is calculated (S43) and a difference g between the reference value e and the latter average density d is calculated (S44). Then, the two differences f, g are compared. If the former average density difference f is greater than the latter average density difference g (S45: Yes), a decision not to carry out the direction change processing is made. If the former average density difference f is equal to or below the latter average density difference g (S45: No), a decision to carry out the direction change processing is made. According to this configuration, the uneven density visually perceived by the user can be reduced even when the image arrangement area A1 and the deceleration-zone print area A2 overlap with each other both in the case where the direction change processing is executed and in the case where the direction change processing is not executed. The reference value e varies according to the material of the continuous forms paper (print tape T and paper roll S), the ink, and the image processing performed on the print image G, or the like, and therefore is set in consideration of the material of the continuous forms paper, the ink, and the image processing performed on the print image G, or the like.

Figure 12:
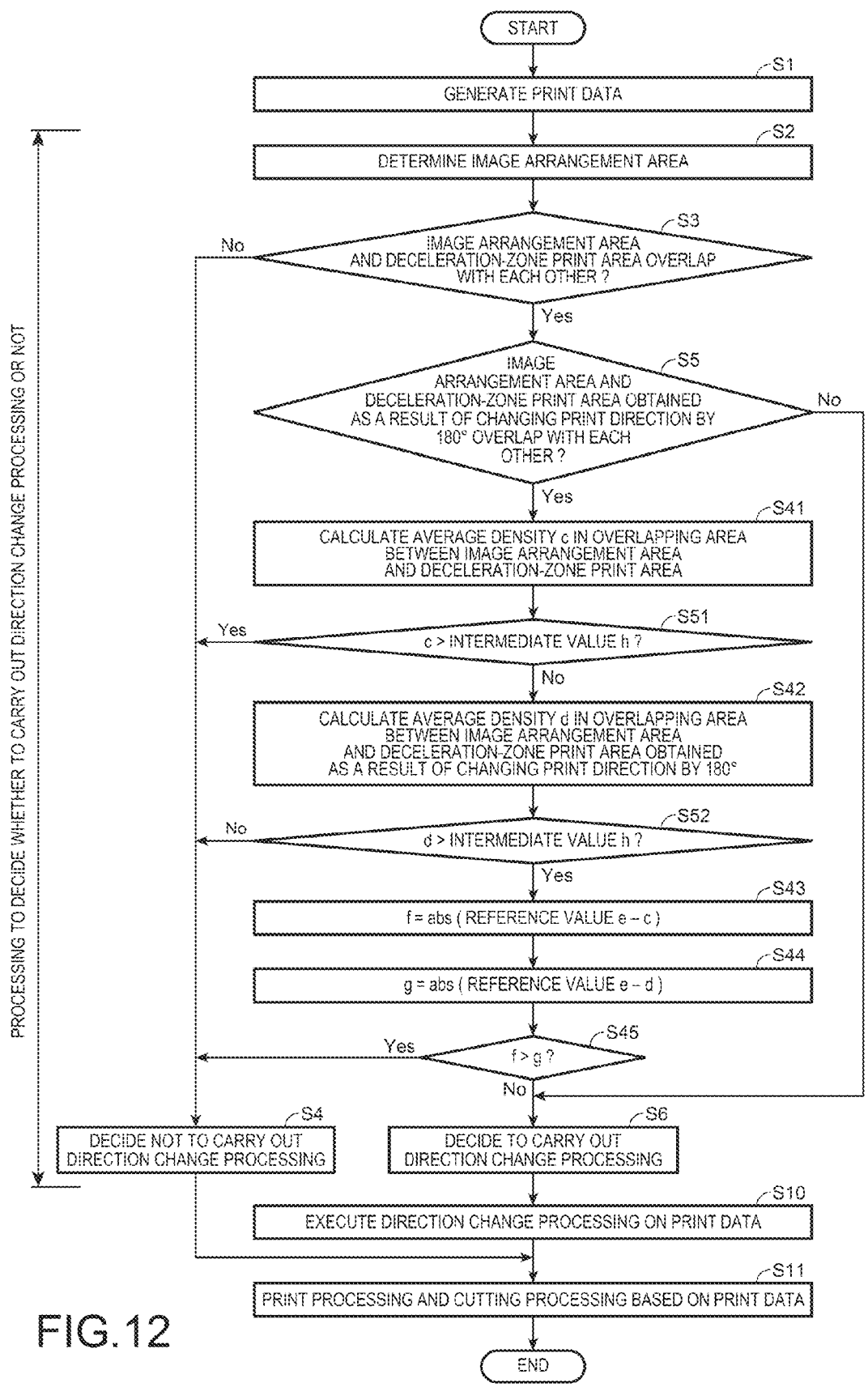
FIG. 12 is a flowchart showing a second modification of the print operation by the tape printer.

If the density in the overlapping area is above an intermediate value (density around 0.5 when the maximum density is 1.0 and no density is 0), uneven density is less visible. Therefore, whether to carry out the direction change processing or not may be decided on the basis of whether the density in the overlapping area is above the intermediate value or not. For example, as shown in FIG. 12, after the average density c in the overlapping area between the image arrangement area A1 and the deceleration-zone print area A2 is calculated (S41), whether the average density c is above an intermediate value h or not is determined (S51). If the average density c is determined as being above the intermediate value h (S51: Yes), a decision not to carry out the direction change processing is made (S4). Meanwhile, if the average density c is determined as not being above the intermediate value h (S51: No), the average density d in the overlapping area between the image arrangement area A1 and the deceleration-zone print area A2' obtained as a result of changing the print direction of the print image G by 180 degrees is calculated (S42). Subsequently, whether the average density d is above the intermediate value h or not is determined (S52). If the average density d is determined as not being above the intermediate value h (S52: No), a decision not to carry out the direction change processing is made (S4). Also, the intermediate value h varies according to the material of the continuous forms paper (print tape T and paper roll S), the ink, and the image processing performed on the print image G, or the like, and therefore is set in consideration of the material of the continuous forms paper, the ink, and the image processing performed on the print image G, or the like.

Figure 13:
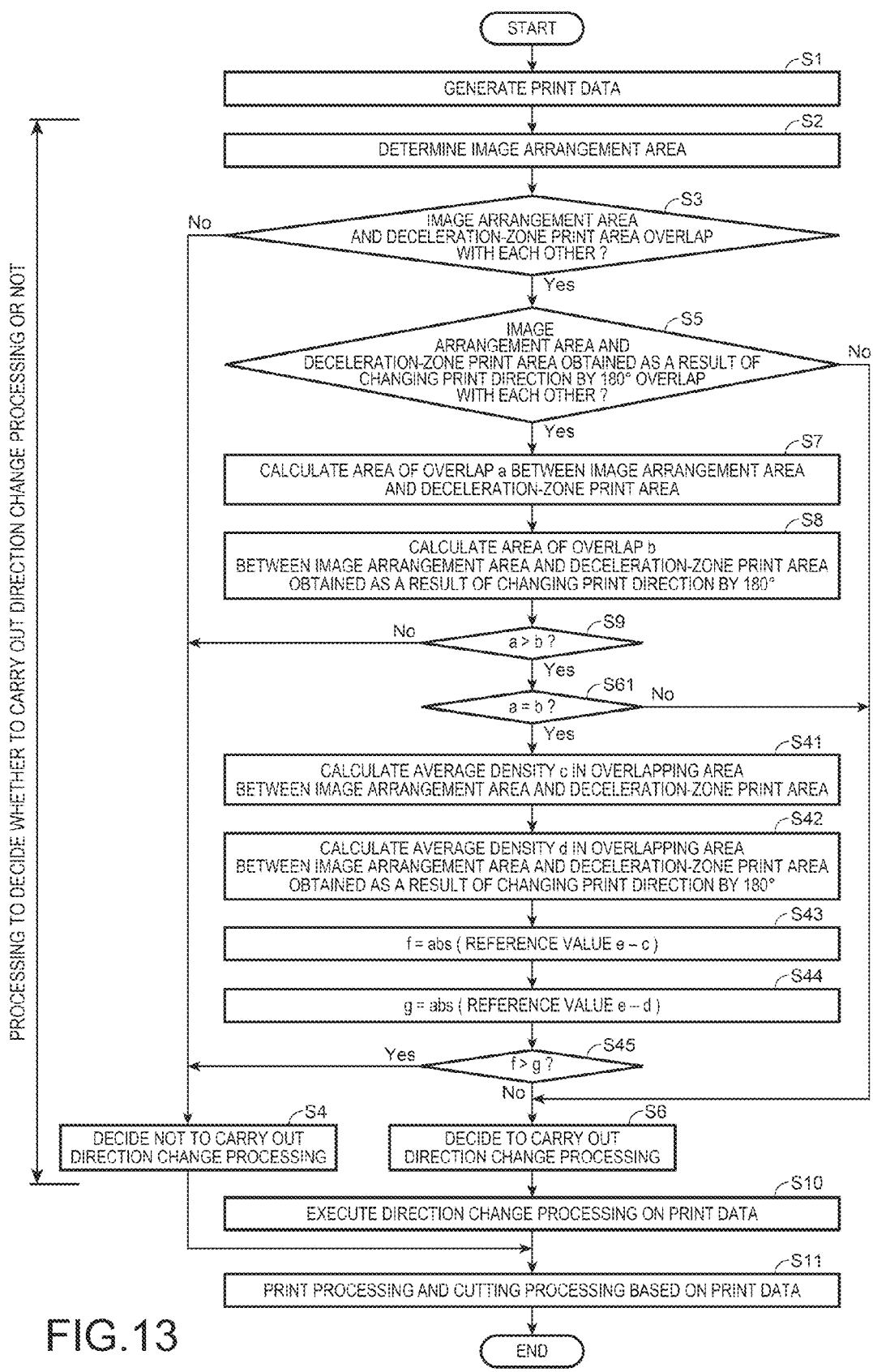
FIG. 13 is a flowchart showing a third modification of the print operation by the tape printer.

Also, the determination based on the area of overlap and the determination based on the difference between the density in the overlapping area and the reference value may be combined to decide whether to carry out the direction change processing or not, as shown in FIG. 13. That is, if the areas of overlap a, b are the same in the case where the direction change processing is executed and in the case where the direction change processing is not executed (S61: Yes), whether to carry out the direction change processing or not may be decided on the basis of the differences f, g between the average densities c, d in the overlapping area and the reference value e. Moreover, the determination on whether the densities are above the intermediate value or not may be combined to these configurations, to decide whether to carry out the direction change processing or not.

In each of the embodiments, whether to carry out the direction change processing or not is decided, using the image arrangement area A1 where an arbitrary image is arranged. However, an area where an image in a color of intermediate gradation is arranged may be used as the image arrangement area A1. That is, uneven density tends to be more visible in an image in a color of intermediate gradation, whereas uneven density is less visible in an image in a color that is not of intermediate gradation. Considering this, only the area where an image in a color of intermediate gradation is arranged is determined as the image arrangement area A1, and whether to carry out the direction change processing or not is decided using this area. Thus, the uneven density visually perceived by the user can be effectively reduced.

It is also possible to determine only an area where an image of a photograph where uneven density tends to be visible is arranged, as the image arrangement area A1. In the case of color print, it is possible to determine only an area where an image in a color that is not the color of the ink used is arranged, as the image arrangement area A1.

In each of the embodiments, whether to carry out the direction change processing or not is decided on the basis of the image arrangement area A1 and the deceleration-zone print area A2 at the time of cutting the continuous forms paper (print tape T and paper roll S). However, this is not limiting. For example, whether to carry out the direction change processing or not may be decided on the basis of the image arrangement area A1 and an acceleration-zone print area at the time of cutting. That is, whether to carry out the direction change processing or not may be decided on the basis of whether an area where printing is carried out by the print head 22, 141 in an acceleration zone at the time of resuming paper feeding after cutting the continuous forms paper and the image arrangement area A1 overlap with each other, the area of overlap, and the like. Also, whether to carry out the direction change processing or not may be decided on the basis of the image arrangement area A1 and the acceleration-zone and deceleration-zone print areas at the time of cutting.

Moreover, while the processing of changing the print direction of the print image by 180 degrees is carried out as the direction change processing in each of the embodiments, processing of changing the print direction of the print image by 90 degrees or by 270 degrees may be carried out as the direction change processing.

Also, while the generated print data is analyzed to determine the image arrangement area A1 on the print image G (S2, S32) in each of the embodiments, this can be omitted if the print layout is decided in advance. For example, in the case where a plurality of types of print forms each of which has a predetermined print layout are stored and the user is allowed to select a desired print form and generate print data, the above process can be omitted because the print layout is decided by the selected print form. Also, if the print layout is decided in advance, the direction change decision unit may be omitted and the whole processing to decide whether to carry out the direction change processing may be omitted.

Also, in the first embodiment, the invention is applied to a thermal printer using a thermal head, and in the second embodiment, the invention is applied to an inkjet printer using an inkjet head. However, these are not limiting. For example, the invention may also be applied to a dot impact printer using a dot impact head.

What is claimed is:

1. A print data generating device which generates print data printable by a printing device, the printing device comprising:
    a feeding unit which feeds continuous forms paper in a scanning direction;
    a line head which performs print processing on the continuous forms paper fed in the scanning direction; and
    a cutting unit which is arranged downstream of the line head in the scanning direction and cuts the continuous forms paper,
    wherein a direction in which a print image is printed is changed in such a way that an image arrangement area on the print image of the print data, and a print area where the print processing by the line head is carried out in a paper feed acceleration/deceleration zone at the time of cutting the continuous forms paper, do not overlap with each other.

2. The print data generating device according to claim 1, comprising:
    a direction change decision unit which decides whether or not to carry out direction change processing of changing the direction in which the print image is printed; and
    a direction change execution unit which executes the direction change processing if the direction change decision unit decides that the direction change processing is to be carried out,
    wherein the direction change decision unit decides whether or not to carry out the direction change processing in such a way that the image arrangement area and the print area in the acceleration/deceleration zone do not overlap with each other.

3. The print data generating device according to claim 2, wherein the direction change decision unit analyzes the print data to determine the image arrangement area on the print image, and decides whether or not to carry out the direction change processing, using the determined image arrangement area.

4. The print data generating device according to claim 2, wherein the direction change execution unit executes processing of changing the direction in which the print image is printed, by 180 degrees, as the direction change processing.

5. The print data generating device according to claim 2, wherein the direction change decision unit decides whether or not to carry out the direction change processing in such a way that an area of overlap between the image arrangement area and the print area in the acceleration/deceleration zone becomes smaller when the image arrangement area and the print area in the acceleration/deceleration zone overlap with each other both in the case where the direction change processing is executed and in the case where the direction change processing is not executed.

6. The print data generating device according to claim 2, wherein the direction change decision unit decides whether or not to carry out the direction change processing in such a way that a difference between a density of a color in an overlapping area where the image arrangement area and the print area in the acceleration/deceleration zone overlap with each other, and a reference value, becomes greater when the image arrangement area and the print area in the acceleration/deceleration zone overlap with each other both in the case where the direction change processing is executed and in the case where the direction change processing is not executed.

7. The print data generating device according to claim 2, wherein the image arrangement area is an area where an image in a color of intermediate gradation is arranged.

8. A printing device comprising:
    the print data generating device according to claim 2;
    a feeding unit;
    a line head; and
    a cutting unit.

9. A printing device comprising:
    the print data generating device according to claim 3;
    a feeding unit;
    a line head; and
    a cutting unit.

10. A printing device comprising:
    the print data generating device according to claim 4;
    a feeding unit;
    a line head; and
    a cutting unit.

11. A printing device comprising:
    the print data generating device according to claim 5;
    a feeding unit;
    a line head; and
    a cutting unit.

12. A printing device comprising:
    the print data generating device according to claim 6;
    a feeding unit;
    a line head; and
    a cutting unit.

13. A printing device comprising:
    the print data generating device according to claim 7;
    a feeding unit;
    a line head; and
    a cutting unit.

14. A print data generating method for generating print data printable by a printing device, the printing device including a feeding unit which feeds continuous forms paper in a scanning direction, a line head which performs print processing on the continuous forms paper fed in the scanning direction, and a cutting unit which is arranged downstream of the line head in the scanning direction and cuts the continuous forms paper, the method comprising:
    changing a direction in which a print image is printed, in such a way that an image arrangement area on the print image of the print data, and a print area where the print processing by the line head is carried out in a paper feed acceleration/deceleration zone at the time of cutting the continuous forms paper, do not overlap with each other.

15. A non-transitory computer-readable medium containing a program causing a computer to execute the print data generating method according to claim 14.

* * * * *